(12) United States Patent
Ujike et al.

(10) Patent No.: US 8,686,697 B2
(45) Date of Patent: Apr. 1, 2014

(54) DC VOLTAGE BOOSTER APPARATUS

(75) Inventors: Hironori Ujike, Wako (JP); Minoru Torii, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 184 days.

(21) Appl. No.: 13/358,519

(22) Filed: Jan. 26, 2012

(65) Prior Publication Data

US 2012/0217949 A1    Aug. 30, 2012

(30) Foreign Application Priority Data

Feb. 28, 2011    (JP) .................................. 2011-041440

(51) Int. Cl.
*H02M 3/156*    (2006.01)

(52) U.S. Cl.
USPC .......................................... 323/222; 323/288

(58) Field of Classification Search
USPC .................. 323/222, 282, 284, 288, 290, 351
See application file for complete search history.

(56) References Cited

U.S. PATENT DOCUMENTS

| 7,193,396 | B2 * | 3/2007 | Orr | ................................ | 323/225 |
| 7,385,833 | B2 * | 6/2008 | Keung | ........................ | 363/56.12 |

FOREIGN PATENT DOCUMENTS

| JP | 2001-055948 | 2/2001 |
| JP | 2009-118589 | 5/2009 |

* cited by examiner

*Primary Examiner* — Jessica Han
(74) *Attorney, Agent, or Firm* — Ditthavong Mori & Steiner, P.C.

(57) ABSTRACT

A DC voltage booster apparatus includes a booster coil, a first capacitor, a switching device, and a second capacitor. The booster coil includes a first end and a second end. The first end of the booster coil is connected to a DC power supply source. The second end of the booster coil is connected to a rectifier diode. The first capacitor is connected between the rectifier diode and a ground. The first capacitor includes a smoothing capacitor. The switching device is disposed between the second end of the booster coil and the ground. The second capacitor is connected in parallel with the rectifier diode.

3 Claims, 2 Drawing Sheets

BACKGROUND ART

DC VOLTAGE BOOSTER APPARATUS

CROSS-REFERENCE TO RELATED APPLICATIONS

The present application claims priority under 35 U.S.C. §119 to Japanese Patent Application No. 2011-041440, filed Feb. 28, 2011, entitled "DC Voltage Booster Apparatus." The contents of this application are incorporated herein by reference in their entirety.

BACKGROUND OF THE INVENTION

1. Field of the Invention

The present invention relates to a direct-current (DC) voltage booster apparatus.

2. Discussion of the Background

DC voltage booster apparatuses for boosting DC voltages are widely known, as in those disclosed in Japanese Unexamined Patent Application Publication Nos. 2001-55948 and 2009-118589. The DC voltage booster apparatus disclosed in the above-described publications includes, as shown in FIG. 3, a booster coil 2 connected at one end to a DC power supply source 1 and at the other end to a rectifier diode 3, a smoothing capacitor 4 connected between the rectifier diode 3 and a ground, and a switching device 5 disposed between a ground and the node between the booster coil 2 and the rectifier diode 3. As the switching device 5, a field-effect transistor (FET), for example, may be used. In this booster apparatus, a boosted DC voltage VOUT is output.

SUMMARY OF THE INVENTION

According to one aspect of the present invention, a DC voltage booster apparatus includes a booster coil, a first capacitor, a switching device, and a second capacitor. The booster coil includes a first end and a second end. The first end of the booster coil is connected to a DC power supply source. The second end of the booster coil is connected to a rectifier diode. The first capacitor is connected between the rectifier diode and a ground. The first capacitor includes a smoothing capacitor. The switching device is disposed between the second end of the booster coil and the ground. The second capacitor is connected in parallel with the rectifier diode.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
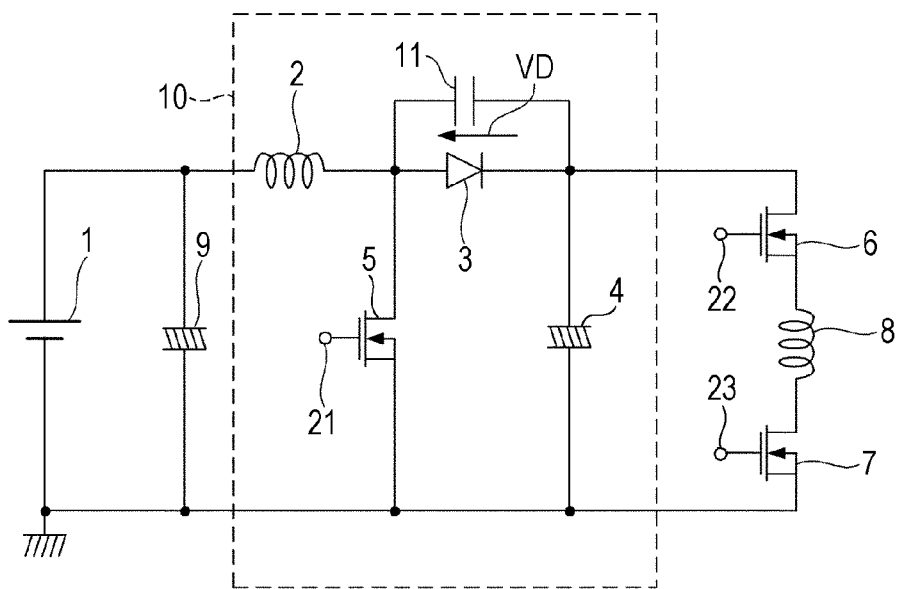
FIG. 1 is a circuit diagram illustrating an electromagnetic valve drive circuit including a DC voltage booster apparatus according to an embodiment of the present invention.

The embodiments will now be described with reference to the accompanying drawings, wherein like reference numerals designate corresponding or identical elements throughout the various drawings.

FIG. 1 illustrates the configuration of an electromagnetic valve drive circuit including a DC voltage booster apparatus 10 according to an embodiment of the present invention. More specifically, FIG. 1 illustrates a circuit configuration in which power is supplied to a solenoid that drives a fuel injection valve of an internal combustion engine.

The DC voltage booster apparatus 10 includes, as shown in FIG. 1, a booster coil 2 connected at one end to a DC power supply source (battery) 1 and at the other end to a rectifier diode 3, a smoothing capacitor 4 connected between the rectifier diode 3 and a ground, and a switching device 5 disposed between a ground and the node between the booster coil 2 and the rectifier diode 3. The DC voltage booster apparatus 10 also includes a capacitor 11 connected in parallel with the rectifier diode 3. That is, the DC voltage booster apparatus 10 has a configuration in which the capacitor 11 is added to a known DC voltage booster apparatus.

A capacitor 9 is provided for an output terminal of the DC power supply source 1. Switching devices 6 and 7 and a solenoid 8 for driving a fuel injection valve are connected to the output side of the DC voltage booster circuit 10.

As the switching devices 5, 6, and 7, FETs are used. A predetermined boosting pulse signal is supplied to a gate terminal 21, which is a control input terminal of the switching device 5, so as to control ON/OFF operations of the switching device 5. When the switching device 5 is turned OFF, the rectifier diode 3 is electrically connected, thereby obtaining a boosted DC voltage across the smoothing capacitor 4.

A fuel injection control signal is supplied to gate terminals 22 and 23 of the switching devices 6 and 7, respectively, so that the switching devices 6 and 7 are turned ON when fuel injection is performed.

Figure 2:
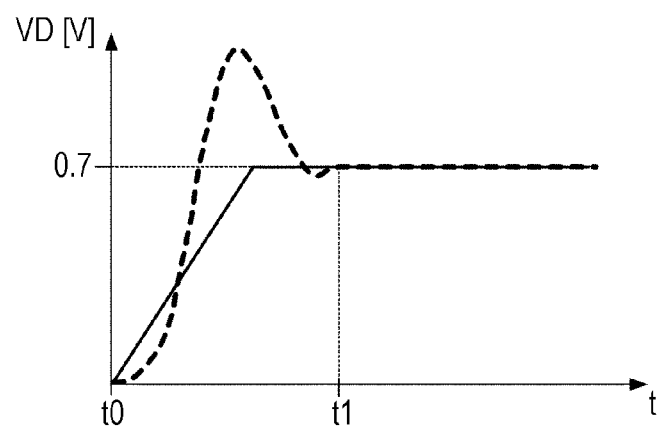
FIG. 2 is a timing chart illustrating the transition of a voltage VD to be generated across a rectifier diode shown in FIG. 1.
Figure 3:
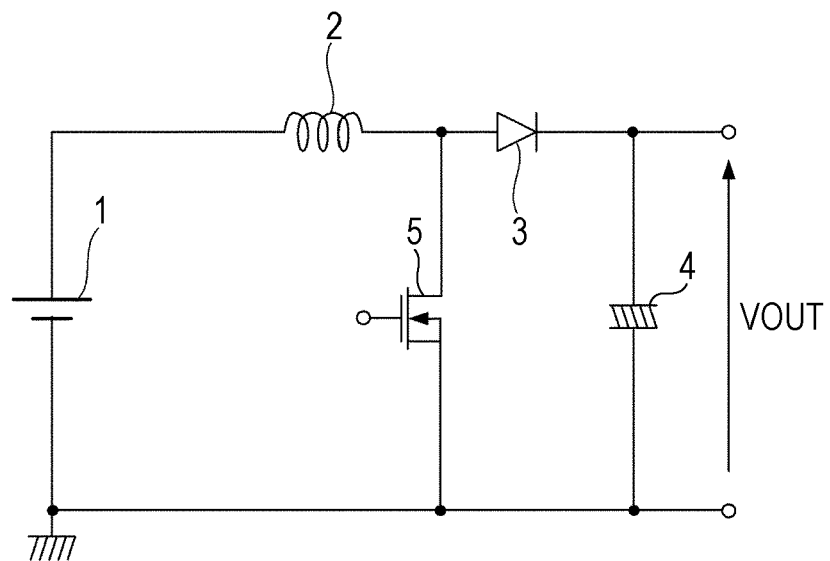
FIG. 3 is a circuit diagram illustrating the configuration of a known DC voltage booster apparatus.

FIG. 2 is a timing chart illustrating the transition of the voltage VD generated across the rectifier diode 3 in a case where the switching device 5 is turned OFF at time t0. In FIG. 2, the solid line indicates the transition of the voltage VD in the DC voltage booster apparatus 10 including the capacitor 11, and the broken line indicates the transition of the voltage VD in a booster apparatus of the related art without the capacitor 11.

In the voltage VD generated in the booster apparatus without the capacitor 11, a voltage spike appears for a short period of time, which has proved to cause radio noise in the FM radio wave band. At time t1, the voltage fluctuation finishes. The period from time t0 to time t1 is about 40 nsec.

Because of the provision of the capacitor 11, a current is supplied to the capacitor 11 until the voltage VD reaches 0.7 V. This prevents the occurrence of a voltage spike, as indicated by the solid line in FIG. 2, thereby making it possible to suppress radio noise. Additionally, because of the function of the capacitor 11, the rectifier diode 3 enters the reverse bias state for a very short period of time after time t0, which makes it possible to decrease the depletion layer within the rectifier diode 3, thereby preventing a delay in response of the rectifier diode 3. Thus, when the DC voltage booster apparatus 10 is used as a drive power source for a fuel injection valve, a delay in opening the fuel injection valve can be prevented, thereby improving the precision in controlling the fuel injection amount.

In this embodiment, the inductance of the booster coil 2 is set to be 30 µH, and the capacitance of the capacitor 11 is set to be 47 pF.

The present invention is not restricted to the above-described embodiment, and various modifications may be made. For example, the present invention is not restricted to a booster apparatus for supplying power to a fuel injection valve, and may be used in other applications, e.g., in a booster apparatus for supplying power to a lamp, as disclosed in Japanese Unexamined Patent Application Publication No. 2009-118589.

According to the embodiment of the present invention, there is provided a DC voltage booster apparatus including: a booster coil connected at one end to a DC power supply source and at the other end to a rectifier diode; a smoothing capacitor connected between the rectifier diode and a ground; a switching device disposed between the other end of the booster coil and a ground; and a capacitor connected in parallel with the rectifier diode.

In the above-described DC voltage booster apparatus, because of the provision of the capacitor connected in parallel with the rectifier diode, the occurrence of a voltage spike is prevented, and also, the rectifier diode enters the reverse bias state for a very short period of time immediately after the switching device is turned OFF, thereby preventing a delay in response of the rectifier diode.

Obviously, numerous modifications and variations of the present invention are possible in light of the above teachings. It is therefore to be understood that within the scope of the appended claims, the invention may be practiced otherwise than as specifically described herein.

What is claimed is:

1. A DC voltage booster apparatus comprising:
a booster coil including a first end and a second end, the first end of the booster coil being connected to a DC power supply source, the second end of the booster coil being connected to a rectifier diode;
a first capacitor connected between the rectifier diode and a ground, the first capacitor comprising a smoothing capacitor;
a switching device disposed between the second end of the booster coil and the ground; and
a second capacitor connected in parallel with the rectifier diode,
wherein the rectifier diode includes a first end and a second end, the first end of the rectifier diode being connected to the second end of the DC power supply source, the second end of the rectifier diode being connected to an injection solenoid provided to drive a fuel injection valve.

2. The DC voltage booster apparatus according to claim 1, wherein
the second capacitor includes a first end and a second end, the first end of the second capacitor being connected to the second end of the DC power supply source and the first end of the rectifier diode, the second end of the second capacitor being connected to the second end of the rectifier diode and the injection solenoid.

3. The DC voltage booster apparatus according to claim 1, further comprising:
a third capacitor connected between the first end of the DC power supply source and the ground.

* * * * *